F. SMITH.
NUT LOCK.
APPLICATION FILED DEC. 2, 1914. RENEWED APR. 3, 1916.
1,199,031.
Patented Sept. 19, 1916.
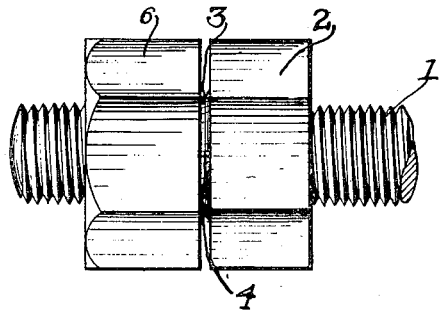
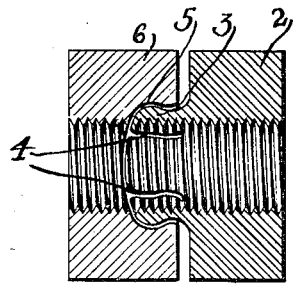
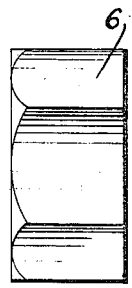
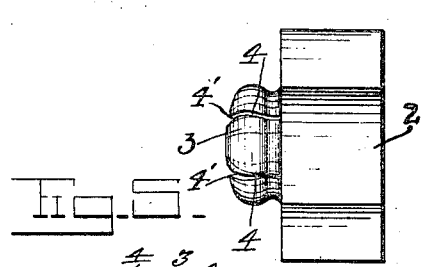
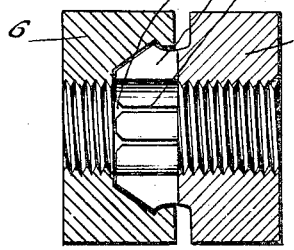
Frank Smith,
Inventor
Witnesses
Ira M. Jones
By
Attorney

UNITED STATES PATENT OFFICE.

FRANK SMITH, OF SACRAMENTO, CALIFORNIA.

NUT-LOCK.

1,199,031. Specification of Letters Patent. Patented Sept. 19, 1916.

Application filed December 2, 1914, Serial No. 875,135. Renewed April 3, 1916. Serial No. 88,755.

*To all whom it may concern:*

Be it known that I, FRANK SMITH, a citizen of the United States, residing at Sacramento, in the county of Sacramento and State of California, have invented certain new and useful Improvements in Nut-Locks, of which the following is a specification.

My invention relates to improvements in nut locks capable of service in fastening the fish plates used in connecting the meeting ends of rails, but also constructed for any vehicle, and for use in any location where an efficient, reliable and practical nut-lock would be required.

The object of the invention is the provision of a nut-lock of the simplest and cheapest construction, which can be instantly applied to the bolt and which will positively lock the nut at any desired place upon the bolt and which in the event of any tendency to unscrewing or working loose will cause a secure locking and prevent the nuts from leaving the bolt.

Another object of my invention is the provision of a nut-lock which can be locked by screwing the nuts home and which will also lock upon the unscrewing of one nut, whereby the nuts cannot possibly become accidentally unlocked or released.

To attain the desired objects my invention consists of a nut-lock embodying novel features of construction and combination of parts for service, substantially as shown, described and claimed herein.

Figure 1 represents a side elevation of a nut-lock constructed in accordance with and embodying my invention. Fig. 2 represents a vertical sectional view showing the nuts only in locked relation. Figs. 3 and 4 represent side views of the pair of nuts constructed in accordance with my invention, and Fig. 5 is a sectional view of a modified construction of my nut-lock.

Referring by numerals to the drawing, the numeral 1 designates the bolt, 2 the inner nut screwed upon the bolt and formed on one side with the projection or head 3, said projection or head being formed with splits 4 to divide the head into a series of elastic portions adapted to fit the cavity or seat 5, in the outer nut 6, whereby when the outer nut is screwed home or screwed out on projection or head of the inner nut, said cavity of the outer nut has its walls bear upon the series of elastic portions on the head of said inner nut causing said portions to have their threads bite into the threads of the bolt, causing a locking action between said bolt and nuts. The locking action, it will be understood, occurs either when the outer nut is screwed home or screwed outward or when any tendency to unscrew or work loose occurs, thus making it absolutely impossible for the nuts to become unlocked after they have been screwed home upon the bolt, allowing the nut-lock to lock two ways either in or out as described. The splits or slots 4 are formed with the flaring or enlarged portions 4', which gives a greater spring or elastic action to the series of elastic portions and insures a greater efficiency in the operation of the nut lock.

It will be understood that my nut-lock can be used upon railroad rails or in any other situation where it could perform its functions and that it embodies the requisites of cheapness, simplicity and durability and is entirely practical in every respect. It will also be noted that the two nuts are applied at the same time, exactly after the manner of a single nut which insures efficiency and a saving of time.

The important feature of my nut lock resides in the locking action occurring either when the nuts are screwed inward or outward with reference to each other, and in both instances there is a space between the nuts to allow the binding or cam action between the cavity of one nut and the spring nut locking portions of the other nut.

I claim:

A nut lock, consisting of a nut having a projection formed with splits to provide a series of spring portions, and a nut having a cavity to receive said projection, and provided with means to force said spring portions inwardly upon either outward or inward movement of said nuts relative to each other to effect the locking of the nuts.

In testimony whereof I affix my signature in presence of two witnesses.

FRANK SMITH.

Witnesses:
JOHN E. PRICE,
H. W. COLSIN.